United States Patent Office 3,291,793
Patented Dec. 13, 1966

3,291,793
SULFONAMIDES
Hans Ulrich Daeniker, Reinach, Basel-Land, Switzerland, assignor to Ciba Corporation, New York, N.Y., a corporation of Delaware
No Drawing. Filed Feb. 26, 1964, Ser. No. 347,390
Claims priority, application Switzerland, Mar. 14, 1963, 3,126/63; Jan. 22, 1964, 731/64
12 Claims. (Cl. 260—239.65)

The present invention relates to new sulfonamides. Especially it concerns (para-aminobenzenesulfonamido)-1-phenyl-1:2:3-triazoles, their $N_1$-acyl derivatives and salts.

The para-aminobenzene sulfonamido radical in the new compounds is preferably in position 4.

The phenyl group in position 1 may be unsubstituted or monosubstituted or polysubstituted, more especially by lower alkyl groups such as methyl, ethyl, propyl or butyl, by lower alkoxy groups such as methoxy, ethoxy, propoxy or butoxy, by halogen atoms such as chlorine, bromine or fluorine or by the pseudohalogen trifluoromethyl.

The triazole ring may contain further substituents; for example it may be C-substituted by lower alkyl groups, such as one of those mentioned above.

As $N_1$-acyl derivatives there may be mentioned more especially those in which the acyl radical is a lower aliphatic, aromatic or araliphatic carboxylic acid radical, for example a carbalkoxy radical, such as the carbethoxy radical, or preferably the radical of a fatty acid, for example a lower fatty acid such as of a lower alkane carboxylic acid, such, for example, as the propionyl, butyryl, valeryl or caproyl group, or the radical of a higher fatty acid, for example the lauroyl, palmityl or oleyl radical, or the radical of a phenyl-fatty acid such as of the phenyl-acetic acid, or of a benzoic acid such as of benzoic acid. In the first place, however, the acyl radical is the acetyl radical.

The new compounds possess good antibacterial properties. For example when given to experimentally infected animals (for example mice), they show a very good curative effect against a wide variety of gram-positive and gram-negative bacteria, for example Staphylococci and Coli bacilli. They may therefore be used as chemotherapeutics, for example for treating bacterial infections. They are also suitable as additives to animal feedstuffs, and may further be used as intermediates for the manfacture of other valuable chemotherapeutics.

Special mention deserve 4-(para-aminobenzenesulfonamido)-1-phenyl-1:2:3-triazole of the formula

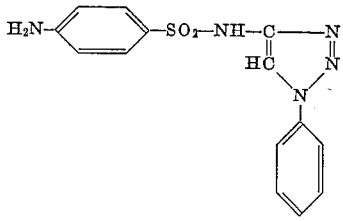

an its $N_1$-acyl derivatives, more especially the acetyl derivative.

The new compounds can be prepared by known methods. Thus, for example, they are obtained, when a para-X-benzenesulfonyl halide, above all the chloride, (where X represents the amino group or a nitro, azo or acylamino group) is condensed with an amino-1-phenyl-1:2:3-triazole, for example a 4-amino- or 5-amino-1:2:3-triazole, or a compound of the formula

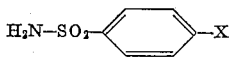

in which X has the meaning given above, is reacted with a Y-1-phenyl-1:2:3-triazole, for example a 4-Y- or 5-Y-1-phenyl-1:2:3-triazole, in which Y represents a halogen atom, such as chlorine, and, in any desired order of succession, in a resulting compound containing a nitro, azo or acylamino group, this group is converted into the amino group by reduction or hydrolysis and/or a resulting bis-para-X-benzenesulfonyl compound is split to form a mono-para-X-benzenesulfonyl compound, and/or, if desired, a resulting compound is $N_1$-acylated.

The reaction of the para-X-benzenesulfonyl halide with the aminotriazole may be carried out, e.g. with the use of a conventional condensing agent, for example an alkali metal carbonate, or preferably with a tertiary organic base such as pyridine, picoline, lutidine, collidine, or a lower trialkylamine such as trimethylamine, or an N:N'-tetraalkyl-diaminoalkane such, for example, as N:N'-tetramethyl-ω:ω'-diaminohexane or the aminotriazole itself and, if desired with the use of a conventional diluent such as benzene, toluene, methylene chloride, chloroform, methylethyl ketone, acetone, dioxane, nitrobenzene or the like or a mixture thereof. Depending on the reaction conditions (such as condensing agent, reaction temperature, diluent or use of an excess of sulfonylhalide) bis-para-X-benzenesulfonyl compounds are obtained as by-products or as main products which can be converted in the usual manner—optionally accompanied by conversion of X into the amino group into the mono-para-X-benzenesulfonyl compounds. In this manner the bis-compounds can be converted into the mono-compounds, for example by hydrolysis or aminolysis, optionally accompanied by a possible hydrolysis of the radical X.

The reaction of the para-X-benzenesulfonamide with the halogeno-1-phenyl-1:2:3-triazole is carried out in a conventional manner. It is of advantage to use the para-X-benzenesulfonamide in the form of a metal salt, for example an alkali or alkaline earth metal salt, or the reaction is performed in the presence of a condensing agent forming such a salt. The last mentioned process using a halogen-1:2:3-triazole as starting material has the advantage that it may be very easily carried out with a para-X-benzenesulfonamide in which X represents the free amino group, whereas in the case of the other process X is preferably a nitro, azo or acylamino group.

The conversion of the nitro, azo or acylamino group into the amino group is performed in a known manner.

Nitro or azo groups or acylamino groups convertible by hydrogenolysis into the free amino group, such as carbobenzoxylamino amino groups, are converted into the free amino group in the usual manner by reduction or hydrogenolysis. Acylamino groups are converted into the free amino groups in the usual manner by hydrolysis.

Acylamino groups are for example aliphatic acylamino groups such as carbalkoxy groups (for example the carbethoxyamino group), alkanoylamino groups such as the propionylamino, butyrylamino or caproylamino group, in the first place the acetylamino group, or dihalophosphorylamino groups, for example the dichlorophosphorylamino group. The acyl radicals in the acylamino groups may also be acyl radicals of dibasic acids. Accordingly, there may also be used starting materials of the formula

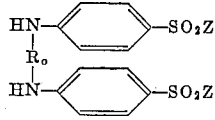

where $R_o$ represents the acyl radical of a dibasic acid, above all the carbonic acid radial, or for example the radical of an alkanedicarboxylic acid, and Z represents a halogen atom or the amino group.

An azo group is for example an arylazo or above all a phenylazo group; in the latter case an especially favourable starting material is a compound of the formula

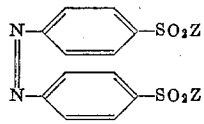

where Z is a halogen atom or the amino group.

According to a particularly suitable process para-acetylaminobenzenesulfonyl chloride is reacted with an amino-1-phenyl-1:2:3-triazole and the condensation product is then hydrolysed.

The $N_1$-acylation is performed in the usual manner with the use of an $N_1$-acylating agent, above all with an acid anhydride or halide, such as an acid chloride. The reaction is advantageously conducted in the presence of a basic agent, such as an inorganic or organic base, for example an alkali metal carbonate or a tertiary amine such as pyridine, picoline, lutidine, collidine, trimethylamine, triethylamine, tributylamine or 1:6-bis-dimethylamino-hexane, and in the presence of an inert diluent, more especially of an organic solvent such as dioxane, benzene, toluene, a halogenated hydrocarbon, for example methylene chloride or chloroform, dimethylformamide, a lower aliphatic ketone such as acetone or methylethylketone, or if desired of the basic agent itself, such, for example, as pyridine, or mixtures thereof, more especially a mixture of pyridine and acetone. It is of advantage to perform the reaction in a medium that is an anhydrous as possible. When an acid halide is used, it is possible to use a metal salt of the sulfonamide, for example an alkali metal salt or preferably the silver salt, in which case the addition of a basic agent, as recommended above, can be dispensed with. There is however no objection to its additional use, for example as diluent.

When $N_1$-acylating compounds in which X stands for the amino group, it must be ensured that the reaction proceeds under mild conditions and with the use of approximately equimolecular proportions of the reactants in order to prevent the formation of $N_1$:$N_4$-bis acyl compounds or, by acyl migration, $N_4$-acyl compounds. It is therefore advantageous to work at a low temperature, for example below 40° C., for example between 10 and 30° C., and in an anhydrous medium. When an acid halide is used it is advisable to start from a metal salt of the sulfonamide, such as its silver salt.

When the acyl group is introduced into the $N_1$-nitrogen atom of a compound in which X does not represent the amino group, preferred starting materials are compounds in which X represents a group convertible into the amino group by reduction; this group is then reduced in known manner, advantageously preventing hydrolysing conditions and higher temperatures to make it impossible for the $N_1$-acyl radical to be eliminated or transferred to the $N_4$-nitrogen atom. It is especially advantageous to perform the reduction with hydrogen in the presence of a catalyst, for example a noble metal catalyst, such as palladium on carbon.

Depending on the reaction conditions and on the starting materials, the final products are obtained in the free form or in the form of their salts which are also included within the scope of the invention. As salts there may be more especially mentioned metal salts, particularly those with alkali, alkaline earth or earth metals, such as sodium, postassium, calcium, magnesim and aluminium. The salts of the new compounds may be converted into the free compounds in a manner known per se, for example by reaction with an acidic agent, such as an acid. On the other hand, a resulting free sulfonamide which contains a hydrogen atom at the $N_1$-nitrogen atom, may be converted into a salt by reaction with a base, more especially with a therapeutically useful base, such as a hydroxide of an alkali, alkaline earth or earth metal, for example sodium, potassium or calcium hydroxide.

The above or other salts of the new compounds may also serve for the purification of the resulting sulfonamides by converting the free sulfonamides into the salts, separating the latter and liberating the free sulfonamides from the salts. In view of the close relationship between a base in the free form and in the form of a salt thereof, whenever a free base is referred to in this context, a corresponding salt is also intended, provided such is possible or appropriate under the circumstances.

The invention includes also any modification of the process in which an intermediate obtainable at any stage of the process is used as starting material and any remaining steps are carried out, or the process is discontinued at any stage thereof, or in which a starting material is formed in the course of a reaction or is used in the form of a salt thereof.

For the reactions of the invention there are preferably used those starting materials which yield the above-mentioned preferred compounds.

The starting materials are known or may be prepared by a method known per se.

The 4-amino-1-phenyl-1:2:3-triazoles, some of which are known, are obtained in a surprisingly very good yield when a corresponding phenylazide is reacted with propiolic acid tertiary butyl ester, the latter ester is reesterified with methanol or ethanol, the resulting methyl or ethyl ester respectively is converted with ammonia into the amide which is then subjected to the degradation according to Hoffmann. This process is likewise included in the invention.

Other objects of the invention are the new starting materials and intermediates, such as the mono- and bis- (para-X-benzensulfonyl) - amino - 1 - phenyl-1:2:3-triazoles.

The new compounds may be used for example in the form of pharmaceutical preparations containing the active principle in admixture or conjunction with a solid or liquid organic or inorganic pharmaceutical excipient suitable for enteral, parenteral or local administration. Suitable excipients are substances that do not react with the new compounds, for example water, gelatine, lactose, starches, colloidal silicic acid, magnesium stearate, talcum, vegetable oils, benzyl alcohols, gums, polyalkylene-glycols, white petroleum jelly, cholesterol or other known medicinal excipients. The pharmaceutical preparations may be, for example, tablets, dragees, ointments or creams, or in liquid form solutions, suspensions or emulsions. They may be sterilized and/or may contain assistant such as preserving, stabilizing, wetting or emulsifying agents, salts for regulating the osmotic pressure, or buffers. They may also contain further therapeutically valuable substances. The preparations are formulated by usual methods.

The new active principles may also be used in the form of additives to animal feedstuffs. Accordingly, the invention includes also these animal feedstuffs or additives to animal feedstuffs that contain the new sulfonamides of the kind described in admixture with the conventional vehicles.

The following examples illustrate the invention.

*Example 1*

10 g. of para-acetylaminobenzenesulfonyl chloride are stirred portionwise at 10° C. into a solution of 7.5 g. of 4-amino-1-phenyl-1:2:3-triazole hydrochloride in 100 cc. of absolute pyridine; the mixture is kept for 1 hour at room temperature and then heated for 2 hours at 60 to 80° C., then cooled, and 400 cc., of 4 N-hydrochloric acid are added. The precipitated crystals are suctioned off, washed with water and recrystallized from 750 cc. of methanol. The resulting product, 4-(para-acetylaminobenzenesulfonamido)-1-phenyl-1:2:3-triazole (melting at 218–219° C. with decomposition), is dissolved in 100 cc.

of 2 N-sodium hydroxide solution. The solution is refluxed for 2 hours, then cooled and the pH is adjusted to 7 with hydrochloric acid. The precipitated crystals are suctioned off, washed with water and recrystallized from 250 cc. of methanol, to yield 4-(para-aminobenzenesulfonamido)-1-phenyl-1:2:3-triazole of the formula

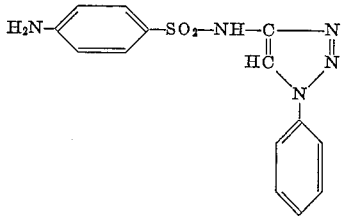

in the form of colorless needles melting at 184–186° C.

The 4-amino-1-phenyl-1:2:3-triazole hydrochloride used as starting material can be prepared in the following manner.

A solution of 30 g. of phenylazide and 30 g. of propiolic acid tertiary butyl ester in 50 cc. of absolute toluene is heated in a tube for 20 hours at 100° C., then allowed to cool and evaporated to dryness under vacuum. The crystalline residue is recrystallized from isopropanol, to yield 1-phenyl-1:2:3-triazole-4-carboxylic acid tertiary butyl ester melting at 100° C.

51.8 g. of the ester are mixed with 1 liter of methanolic hydrochloric acid and refluxed for 4 hours and then evaporated to dryness. The residue is recrystallized from methanol, to yield 1-phenyl-1:2:3-triazole-4-carboxylic acid methyl ester melting at 121° C.

37 g. of the above methyl ester are heated with 250 cc. of liquid ammonia in an autoclave for 4 hours at 80 to 90° C., then cooled, the excess ammonia is allowed to evaporate, and the crystalline residue is recrystallized from alcohol, to yield 1-phenyl-1:2:3-triazole-4-carboxylic acid amide melting at 229–231° C.

300 cc. of 2 N-sodium hydroxide solution are mixed at 0° C. with 20 g. of bromine; 20.4 g. of 1-phenyl-1:2:3-triazole-4-carboxylic acid amide are added and the mixture is kept for 1 hour at 0° C. and then for 2 hours at room temperature, refluxed for 4 hours, then allowed to cool, and repeatedly extracted with chloroform. The chloroform extract is extracted with dilute hydrochloric acid, and the hydrochloric acid layer is evaporated to dryness under vacuum. The crystalline residue is recrystallized from absolute alcohol, to yield 4-amino-1-phenyl-1:2:3-triazole hydrochloride melting at 184–186° C. The corresponding free base is prepared in the usual manner; after recrystallization from isopropanol it melts at 104–105° C.

Example 2

6.3 g. of 4-(para-aminobenzenesulfonamido)-1-phenyl-1:2:3-triazole are dissolved in a mixture of 50 ml. of absolute acetone and 3.2 ml. of absolute pyridine; 2 ml. of acetic anhydride are added dropwise in the course of a few minutes and the batch is stirred overnight at room temperature. After the addition of 200 ml. of water and 1 ml. of concentrated ammonia, an oil separates which crystallizes slowly. The reaction product is recrystallized from acetonitrile to yield $N_1$-acetyl-4-(para-aminobenzenesulfonamido)-1-phenyl-1:2:3-triazole of the formula

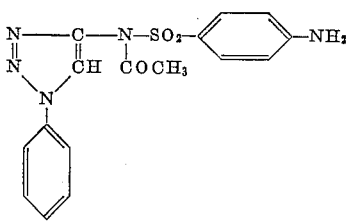

melting at 181–183° C. with decomposition.

Example 3

6 g. of sulfanilamide are added to a solution of 0.8 g. of sodium in 50 ml. of absolute alcohol, and the resulting suspension is evaporated to dryness after being stirred well. The colorless crystalline residue is then suspended in 50 ml. of absolute dimethylformamide, 6 g. of 5-chloro-1-phenyl-1:2:3-triazole are added and the resulting mixture stirred for 3 hours at 50–60° C. The batch is then evaporated to dryness in vacuo and the remaining colorless syrup is treated with 100 ml. of water and 2 ml. of glacial acetic acid, left to stand for some time at 0° C. to yield crystals. The latter are recrystallized from methanol to yield 5-(para-aminobenzenesulfonamido)-1-phenyl-1:2:3-triazole of the formula

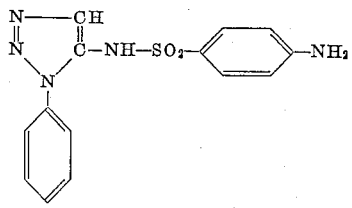

melting at 196–198° C. with decomposition.

Example 4

12 g. of para-acetylaminobenzenesulfonyl chloride are added in portions and with stirring to a solution of 10 g. of 4-amino-5-methyl-1-phenyl-1:2:3-triazole hydrochloride in 50 ml. of absolute pyridine at 0° C.; the reaction mixture is then stirred for one hour at room temperature and for 3 hours at 60–70° C. After cooling, 250 ml. of water are added to the batch, the precipitated crystals are filtered with suction, and washed well with water. The resulting crude 4-(para-acetylaminobenzenesulfonamido)-5-methyl-1-phenyl-1:2:3-triazole melting at 251° C. with decomposition is dissolved in 200 ml. of 2 N-sodium hydroxide solution, the solution boiled under reflux for 2 hours and, after cooling, the pH value of the solution is adjusted to 7. The precipitated crystals are filtered with suction and recrystallized from alcohol to yield 4-(para-aminobenzenesulfonamido) - 5 - methyl-1-phenyl-1:2:3-triazole of the formula

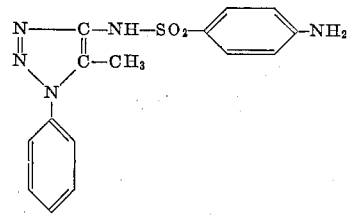

melting at 191–192° C.

The 4-amino-5-methyl-1-phenyl - 1:2:3 - triazole hydrochloride used as starting material may be prepared as follows:

44 g. of 5-methyl-1-phenyl-1:2:3-triazole-4-carboxylic acid amide are added to a solution of 13 ml. of bromine in 600 ml. of 2 N-sodium hydroxide solution at 0° C. and the resulting solution is boiled under reflux for 6 hours after being allowed to stand for some time. After cooling, the reaction mixture is extracted with chloroform, the latter is extracted with aqueous 2 N-hydrochloric acid and the extract evaporated to dryness in vacuo. The crystalline residue is recrystallized from methanol to yield the hydrochloride of 4-amino-5-methyl-1-phenyl - 1:2:3 - triazole in the form of colorless crystals melting at 191–192° C. with decomposition.

Example 5

Tablets containing 500 mg. of 4-(para-aminobenzenesulfonamido)-1-phenyl-1:2:3-triazole may be prepared with the following ingredients:

| | Per tablet, mg. |
|---|---|
| 4-(para-aminobenzenesulfonamido)-1-phenyl-1:2:3-triazole | 500.0 |
| Wheat starch | 35.0 |
| Colloidal silicic acid with hydrolysed starch | 30.0 |
| Gelatine | 6.0 |
| Arrowroot | 30.0 |
| Magnesium stearate | 6.0 |
| Talc | 18.0 |
| | 625.0 |

*Method.*—4-(para-aminobenzenesulfonamido)-1-phenyl-1:2:3-triazole is mixed with wheat starch and colloidal silicic acid with hydrolysed starch. The gelatine is dissolved in ten times its quantity by weight of water and the power-mixture kneaded with it. The mixture is dried, comminuted and after the addition of arrowroot, talc and magnesium stearate, compressed into tablets in the conventional manner.

Example 6

In an analogous manner as described in Example 1 there may be prepared from para-acetylaminobenzenesulfonyl chloride and
4-amino-1-(meta-tolyl)-1:2:3-triazole,
4-amino-1-(para-ethoxyphenyl)-1:2:3-triazole,
4-amino-5-ethyl-1-(ortho-chlorophenyl)-1:2:3-triazole,
4-amino-1-(para-trifluoromethylphenyl)-1:2:3-triazole,
5-amino-4-methyl-1-(para-tolyl)-1:2:3-triazole,
5-amino-1-(para-bromophenyl)-1:2:3-triazole or
5-amino-1-(ortho-trifluoromethylphenyl)-1:2:3-triazole, respectively, the
4-(para-aminobenzenesulfonamido)-1-(meta-tolyl)-1:2:3-triazole,
4-(para-aminobenzenesulfonamido)-1-(para-ethoxyphenyl)-1:2:3-triazole,
4-(para-aminobenzenesulfonamido)-5-ethyl-1-(ortho-chlorophenyl)-1:2:3-triazole,
4-(para-aminobenzenesulfonamido)-1-(para-trifluoromethylphenyl)-1:2:3-triazole,
5-(para-aminobenzenesulfonamido)-4-methyl-1-(para-tolyl)-1:2:3-triazole,
5-(para-aminobenzenesulfonamido)-1-(para-bromophenyl)-1:2:3-triazole and
5-(para-aminobenzenesulfonamido)-1-(ortho-trifluoromethylphenyl)-1:2:3-triazole.

Example 7

In an analogous manner as described in Example 2 there may be prepared from acetic acid anhydride or benzoyl chloride respectively and 5-(para-aminobenzenesulfonamido)-1-(para-methoxyphenyl)-1:2:3-triazole, the $N_1$-acetyl-5-(para-aminobenzenesulfonamido)-1-(para-methoxyphenyl)-1:2:3-triazole and the $N_1$-benzoyl-5-(para-aminobenzenesulfonamido)-1-(para-methoxyphenyl)-1:2:3-triazole.

What is claimed is:
1. A compound of the formula

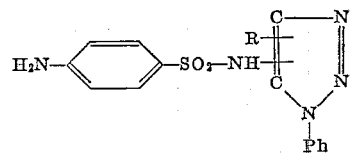

in which Ph stands for a member selected from the group consisting of phenyl and phenyl substituted by at least one member selected from the group consisting of lower alkyl, halogen and trifluoromethyl, and R stands for a member selected from the group consisting of hydrogen and lower alkyl.

2. A compound claimed in claim 1 in the form of an alkali metal, alkaline earth metal, or earth metal salt.

3. An $N_1$-carboxylic acid acyl-derivative of a compound claimed in claim 1.

4. A compound of the formula

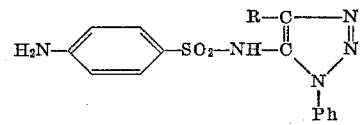

in which Ph stands for a member selected from the group consisting of phenyl, lower alkylphenyl, lower alkoxyphenyl, halogenophenyl and trifluoromethylphenyl and R for a member selected from the group consisting of hydrogen and lower alkyl.

5. A compound claimed in claim 4 in the form of an alkali metal, alkaline earth metal or earth metal salt.

6. A member selected from the group consisting of $N_1$-carbolower alkoxy-, $N_1$-lower alkonyl-, $N_1$-phenylacetyl- and $N_1$-benzoyl-derivatives of the compounds claimed in claim 4.

7. A compound of the formula

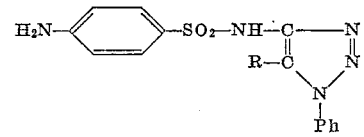

in which Ph stands for a member selected from the group consisting of phenyl, lower alkylphenyl, lower alkoxyphenyl, halogenophenyl and trifluoromethylphenyl and R for a member selected from the group consisting of hydrogen and lower alkyl.

8. A compound claimed in claim 7 in the form of an alkali metal, alkaline earth metal or earth metal salt.

9. 4-(para-aminobenzenesulfonamido)-1-phenyl-1:2:3-triazole.

10. $N_1$-acetyl-4-(para-aminobenzenesulfonamido)-1-phenyl-1:2:3-triazole.

11. 5-(para-aminobenzenesulfonamido)-1-phenyl-1:2:3-triazole.

12. 4-(para-aminobenzenesulfonamido)-5-methyl-1-phenyl-1:2:3-triazole.

References Cited by the Examiner

UNITED STATES PATENTS

| 2,228,303 | 1/1941 | Fischer | 260—156 |
| 2,343,234 | 2/1944 | Williams | 260—162 |
| 2,714,110 | 7/1955 | Webb et al. | 260—308 |
| 2,971,842 | 1/1961 | Moore et al. | 260—308 X |
| 3,056,780 | 10/1962 | Grundwald et al. | 260—239.75 |

OTHER REFERENCES

Elderfield, Heterocyclic Compounds, vol. 7, pp. 415–416, John Wiley and Sons, New York, N.Y. (1961).

JOHN D. RANDOLPH, *Primary Examiner.*